United States Patent [19]
Wurmb et al.

[11] 3,988,284
[45] Oct. 26, 1976

[54] REINFORCED THERMOPLASTICS

[75] Inventors: Rolf Wurmb, Heidelberg; Joachim Kunde, Frankenthal; Dieter Stein, Limburgerhof; Hermann Gausepohl, Mutterstadt; Rainer Theysohn, Ludwigshafen, all of Germany

[73] Assignee: BASF Aktiengesellschaft, Ludwigshafen (Rhine), Germany

[22] Filed: Jan. 3, 1975

[21] Appl. No.: 538,454

[30] Foreign Application Priority Data
Jan. 18, 1974 Germany............................ 2402277

[52] U.S. Cl............................ 260/33.6 UB; 252/59; 260/33.6 R; 260/669 P; 260/857 L; 260/857 UN; 260/859 R; 260/873; 264/300
[51] Int. Cl.² ..................... C08K 5/01; C08L 77/00
[58] Field of Search........ 260/857 L, 669 P, 33.6 R, 260/33.6 UB, 857 UN, 859 R, 873; 252/59; 264/300

[56] References Cited
UNITED STATES PATENTS

| | | | |
|---|---|---|---|
| 2,474,881 | 7/1948 | Young et al. | 260/669 P |
| 2,986,411 | 5/1961 | Anderson | 264/300 |
| 3,332,854 | 5/1967 | Yasui et al. | 260/857 |
| 3,585,094 | 6/1971 | Ruggles | 264/300 |
| 3,790,515 | 2/1974 | Rosenbaum et al. | 264/300 |
| 3,803,254 | 4/1974 | Hattori et al. | 260/669 P |

OTHER PUBLICATIONS

Modern Plastics Encyclopedia 1970–1971 (McGraw–Hill) (N.Y.) (Oct. 1970), pp. 382 & 386.

*Primary Examiner*—Donald E. Czaja
*Assistant Examiner*—H. H. Fletcher
*Attorney, Agent, or Firm*—Johnston, Keil, Thompson & Shurtleff

[57] ABSTRACT

Reinforced plastics containing an addition of from 0.05 to 2% w/w of a styrene oligomer.

1 Claim, No Drawings

REINFORCED THERMOPLASTICS

This invention relates to thermoplastic polycondensates and polyadducts containing conventional reinforcing agents and additionally lubricants based on hydrogenated or unhydrogenated styrene oligomers.

In the manufacture of injection moldings of fiber-reinforced thermoplastics, lubricants are added to the plastics materials to obtain good flow of the molten polymer during processing. At the same time, the lubricant can act as mold release agent to achieve short cycle times. Furthermore, good lubricants cause smooth surfaces on moldings of reinforced thermoplastics.

Normally, the lubricants used when processing reinforced thermoplastics by injection molding are metal salts, esters or amides of fatty acids. Although these additives improve the flow of the melt, the mold release properties and, in many cases, the surface of the moldings, they usually impair the mechanical properties such as strength and toughness, since there is deterioration of the adhesion between the filler and the plastics material. Moreover, these lubricants often have an undesirable chain-stopping or degrading effect on the polymer chains of polycondensates, this leading to a reduction in the viscosity.

It is an object of the invention to provide lubricants for reinforced polycondensates and polyadducts, which lubricants improve the flow of the polymer melts, the mold release properties and the surfaces of the moldings without impairing the mechanical properties.

According to the invention, this object is achieved by adding from 0.05 to 2.0% w/w of hydrogenated or unhydrogenated styrene oligomers to the reinforced thermoplastic polycondensates and polyadducts.

The polycondensates and polyadducts concerned have thermoplastic properties and have the common feature of possessing hetero atoms such as oxygen and nitrogen in the polymer chain.

Suitable compounds are as follows: Polyamides obtained either by polyaddition of lactams having from 4 to 12 ring members or by polycondensation of the corresponding ω-aminocarboxylic acids or by polycondensation of salts of aliphatic dicarboxylic acids with aliphatic or aromatic diamines, also copolyamides, linear and partially crystalline polyesters obtained from terephthalic acid and aliphatic diols, e.g. ethylene glycol and butanediol-1,4, by condensation, polycarbonate, thermoplastic polyurethanes and polyoxymethylene and polyoxymethylene copolymers.

The main reinforcing agents used are E-glass fibers in amounts of from 10 to 60 and preferably from 20 to 40% w/w, based on the mixture. The glass fibers generally have an average length of from 0.05 to 0.5 mm and a diameter of from 9 to 15 μm. However, glass spheres, carbon fibers and mineral reinforcing materials such as asbestos, chalk, calcined kaolins and silica flour are also suitable reinforcing agents. These reinforcing agents may be coated with conventional sizes and adhesion promoters based on organosilanes, e.g. γ-aminopropyltriethoxysilane.

The lubricants used are styrene oligomers in an amount of from 0.05 to 2% and in particular from 0.1 to 1%, by weight. The average molecular weight of the styrene oligomers is generally from about 300 to 3000 and preferably from 500 to 2000. Molecular weight measurement is effected in an osmometer using benzene as solvent. It is not essential for the styrene oligomers used to exhibit uniform molecular weight.

Synthesis of the styrene oligomers may be effected, for example, by thermal oligomerization of styrene at from 200° to 400° C or by free-radical oligomerization at temperatures between 150° and 250° C. Alternatively, hydrogenated oligomers may be used, these being produced by known methods at temperatures between 50° and 250° C and under hydrogen pressures of from 1 to 200 bars in the presence of hydrogenation catalysts such as Raney nickel, platinum, palladium or complex catalyst systems, such as are produced from transition metal compounds and aluminumorganyls.

The advantages achieved by the invention are that the flow, surface and color of the moldings showed improvement over the use of conventional lubricants. Furthermore, the styrene oligomers when used as lubricants cause much less or no impairment of the adhesion between the reinforcing agents and the polymer matrix, unlike conventional lubricants, so that the mechanical properties such as the tensile strength are distinctly better. This effect is particularly noticeable when the specimens are previously subjected to the influence of moisture. Unlike conventional lubricants such as metal salts or amides of long-chain carboxylic acids or long-chain alcohols, styrene oligomers have no chain-stopping or degrading effect on the polymer chains of polycondensates, and consequently the quality of the plastics used remains unchanged over a wide processing range.

The reinforced molding compositions may contain conventional additives such as stabilizers, flameproofing agents, processing auxiliaries such as talc and calcium fluoride, and pigments and dyes.

In addition to the lubricants of the invention, the reinforced polycondensates and polyadducts may, where necessary, also contain conventional lubricants such as metal salts, esters and amides of higher fatty acids, in amounts of from 0.01 to 1% by weight.

The molding compositions of the invention may be manufactured by the processes usually employed for reinforced thermoplastics. Manufacture may be effected in any suitable kneading apparatus in which the thermoplastics are melted and blended with the reinforcing fibers, lubricants and other additives. The lubricants may, if desired, be used in the form of a masterbatch with the plastics material. They may be applied to the plastics material before the mixture is prepared or added at a later stage prior to processing.

In the following Examples the parts and percentages are by weight.

EXAMPLE 1

65 parts of polycaprolactam having a K value of 72 (measured by the method proposed by H. Fikentscher in Cellulosechemie 13 (1932), page 58, in 1% solution in concentrated sulfuric acid) were blended with the lubricants listed in Table 1 below in a high-speed mixer and then melted in an extruder at from 260° to 290° C. 35 parts of glass fibers were introduced to the molten material through a devolatilizing port, after said fibers had been treated with a size and an aminopropyl silane acting as adhesion promoter.

The extrudate was cooled and granulated, the granules then being injection molded to specimens at plastic temperatures of 280° C. The mechanical values listed in Table 1 below were measured on the freshly injection-molded specimens. The impact-resistance

[cmkgcm$^{-2}$] was measured according to DIN 53,453, and the breaking energy in cmkg was determined on round discs measuring 2 × 60 mm according to draft DIN specification 53,443.

TABLE 1

| Test | Lubricant (% w/w) | Impact Resistance | K value | breaking energy |
|---|---|---|---|---|
| a | 0.5 calcium stearate | 48.3 | 68.4 | 21.7 |
| b | 0.5 styrene oligomer (mol. wt. about 1000) | 51.6 | 71.3 | 32.4 |
| c | 1 styrene oligomer (mol. wt. about 1000) | 54.7 | 72.3 | 34.9 |

EXAMPLE 2

65 Parts of polybutylene terephthalate (K value 71.5 as determined in 0.5% solution in phenol/o-dichlorobenzene (3:2) according to H. Fikentscher) were treated as in Example 1 with known lubricants and with styrene oligomer and contained 30% w/w of glass fibers which in this case had been treated with a γ-glycidoxypropyl silane as adhesion promoter. The processing temperatures were from 240° to 270° C.

The surface quality was determined on specimens injection-molded at 260° C, these being in the form of round discs having a diameter of 6 mm and a thickness of 2 mm.

TABLE 2

| | Additive | Surface |
|---|---|---|
| (a) | 0.5% of zinc stearate | many protruding glass fibers |
| (b) | 1.0% of polyethylene wax, mol. wt. about 100,000 | " |
| (c) | 0.5% N,N'-distearoyl ethylene diamide | " |
| (d) | 0.5% styrene oligomer mol. wt. about 1000 | smooth surface |
| (e) | 1.0% styrene oligomer mol. wt. about 800 | " |

We claim:
1. Thermoplastic polycondensates and polyadducts selected from the group consisting of polyamides, polyesters, polycarbonates, polyurethanes, and polyoxymethylenes, said polycondensates and polyadducts containing from 10 to 60% by weight of conventional reinforcing agents and also an addition of from 0.05 to 2% by weight of a styrene oligomer.

* * * * *